United States Patent [19]

Berger et al.

[11] Patent Number: 4,464,446

[45] Date of Patent: Aug. 7, 1984

[54] ANODES OF COMPOSITE MATERIALS AND ACCUMULATORS USING SOLID ANODES

[75] Inventors: Michel Berger, Meze; Pierre Schaeffner, St-Medard-en-Jalles, both of France

[73] Assignee: Societe Civile Des Composites Electrolytiques, Paris, France

[21] Appl. No.: 500,326

[22] Filed: Jun. 2, 1983

[30] Foreign Application Priority Data

Jun. 11, 1982 [FR] France .................... 82 10257
Oct. 22, 1982 [FR] France .................... 82 17736

[51] Int. Cl.$^3$ .............................................. H01M 6/14
[52] U.S. Cl. ..................................... 429/190; 429/206; 429/209; 429/229; 429/235
[58] Field of Search ........................... 429/229–231, 429/190, 206, 223, 209, 233–235; 252/182.1, 512

[56] References Cited

U.S. PATENT DOCUMENTS

| 3,042,732 | 7/1962 | Kordesch | 136/30 |
| 3,451,851 | 6/1969 | Stanimirovitch | 136/30 |
| 3,476,604 | 11/1969 | Faber | 136/36 |
| 4,037,033 | 7/1977 | Takamura et al. | 429/229 X |
| 4,215,190 | 7/1980 | Ferrando et al. | 429/235 X |
| 4,332,870 | 6/1982 | Parsen et al. | 429/229 X |
| 4,358,517 | 11/1982 | Jones | 429/206 |
| 4,359,510 | 11/1982 | Iaskier | 429/144 |
| 4,378,414 | 3/1983 | Furukarva et al. | 429/229 X |
| 4,415,636 | 11/1983 | Charkey | 429/229 X |

Primary Examiner—Charles F. LeFevour
Attorney, Agent, or Firm—Weingarten, Schurgin, Gagnebin & Hayes

[57] ABSTRACT

The present invention relates to anodes of composite materials, which are formed on a support constituted by fibrils, which are coated with a conducting layer of copper of thickness comprised between 3 and 10 microns. The copper layer is covered with a layer of cadmium of thickness comprised between 3 and 6 microns and the latter is covered with a layer of zinc of thickness greater than about 20 microns.

7 Claims, 4 Drawing Figures

ANODES OF COMPOSITE MATERIALS AND ACCUMULATORS USING SOLID ANODES

BACKGROUND OF THE INVENTION

The present invention relates to anodes of composite materials and accumulators utilising said anodes.

For very many years, it has been known that the technical characteristics (energy per unit mass-voltage-lifespan-efficiency) of batteries are very closely bound up with the nature and structure of the electrodes used for these batteries. This is particularly the case for batteries comprising known electrodes of the zinc type.

GENERAL DESCRIPTION OF THE INVENTION

It is an object of the present invention to provide electrodes of a particular structure enabling, when they are used with known cathodes, the efficiency and operating conditions of batteries to be improved.

According to the present invention there are provided anodes characterised in that they are formed by a support constituted by fibrils, said fibrils being coated with a conductive layer of copper of thickness comprised between 3 and 10 microns, said copper layer being itself covered with a layer of cadmium of thickness comprised between 3 and 6 microns and said cadmium layer being itself covered with a layer of zinc of thickness greater than about 20 microns.

The support of the anodes according to the invention is hence constituted by a material in the form of fibrils; said material may be a conductor (carbon, graphite ...) or a non-conductor (plastic material such as polyamide, polyester, polyethylene, or a glass, or a refractory material, etc.). Such a material will be in the form of fibrils when each fibre of said material will comprise between about 1,000 and about 30,000 fibrils per square millimeter. Materials in the form of fibrils thus used have a very high effective surface area, namely about 30 to about 200 m$^2$/m$^2$ of apparent surface area.

This support material may be used in the form of a flock; however, it is generally used in the form of sheets, that is to say of directionally organised structures. These structures are, for example, constituted simply by stands arranged parallel to one another in a given direction or by braided or woven elements.

Said support is covered with a thin layer (3 to 10 microns) of a conducting metal; the essential properties of said conducting metal are the following: it is a very good conductor of electricity, it is inert with respect to the material constituting the fibril support, it can easily be deposited on said support and adhere firmly thereto, it is preferably little sensitive to the medium in which the electrode according to the invention will be immersed and it can receive a layer of a barrier metal. Among the metals utilisable having this set of properties, copper has been shown to be most advantageous. The copper deposit on the support must be formed so that each fibril is coated with copper uniformly.

The fibril support coated with a copper layer than receives a layer of a barrier metal. This barrier metal must, on the one hand, ensure the complete protection of the copper with respect to the medium in which the copper is immersed, on the other hand it must isolate the copper from the active material and finally be capable of receiving an adherent layer of the active surface material, namely the zinc. For this, said metal must have an electrical potential little different from that of the surface material.

It has been found that this barrier metal was preferably constituted by cadmium deposited in a layer of thickness comprised between 3 and 6 microns. Here again, the deposit of this barrier metal must be formed so that each copper plated fibril is coated with said barrier metal over its whole surface area.

Finally, the barrier metal is in its turn coated with an active surface material which is zinc. The zinc layer, which is the working layer, is generally fairly thick, that is to say it generally is more than 20 microns thick; each copper- and cadmium-plated fibril must be coated with said zinc layer.

BRIEF DESCRIPTION OF THE DRAWINGS

The invention will be more fully understood in reading the detailed description which follows of preferred embodiments, illustrated in the accompanying drawings, said description and drawings being given of course purely by way of non-limiting example.

In the drawings.

DESCRIPTION OF PREFERRED EMBODIMENTS

Figure 1:
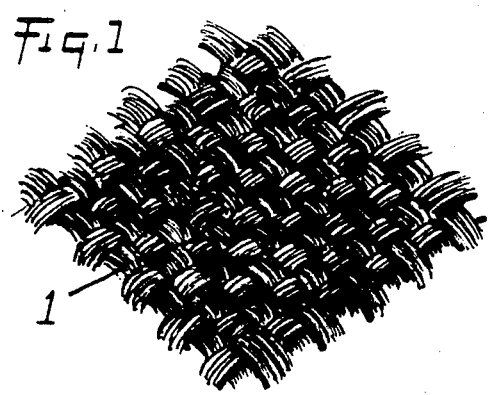
FIG. 1 is a view of a support, of graphite fibres for example, constituted by braids arranged in two perpendicular directions.

In the embodiment shown in FIG. 1, there is used as a support material:
  either a fabric of carbon fibres,
  or fibres of polyamides which may be aromatic or not, whose diameter is comprised between about 5 and about 10 microns,
  or fibres of glass of average diameter about 7 microns.

Figure 2:
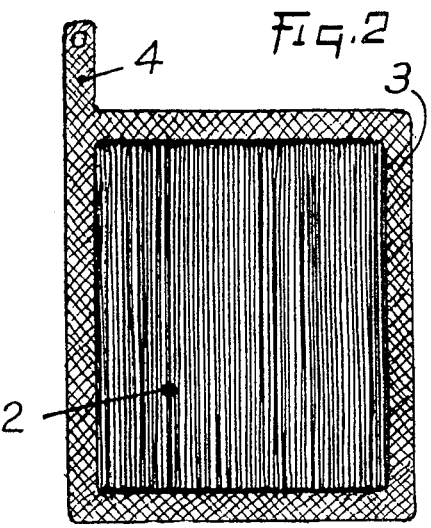
FIG. 2 is a view of an anode according to the invention in which the fibres, themselves formed of fibrils, are arranged in parallel between two sides of a conducting frame; on this Figure, there are shown diagrammatically fibres 2 stretched on a frame 3, said frame being provided with a terminal 4.

On this support material (if necessary arranged in the form of woven braids as shown in FIG. 1 or arranged in a single orientation between two sides of a conducting frame as in FIG. 2), there are deposited, by dipping into a bath containing a copper salt, a layer of copper of thickness about 3 microns. Examination, with a microscope of the product obtained, shows that the copper deposit is completely uniform and that only the contact points between two fibrils of the support material show slight overthickness of the local deposit of the copper.

On the copper-plated product so obtained, is deposited preferably electrolytically or non-electrolytically, a layer of cadmium of thickness about 3 microns. On the cadmium layer so obtained, each fibril is coated with a zinc layer; the thickness of the zinc layer is of the order of 25 microns.

The anode according to the present invention has a certain number of specific properties which may be summarised as follows:

(1) A supple and flexible structure (called "lung") enables it to withstand without mechanical stress the "breathing" of the active material during the operation of the electrode in the accumulator. In addition, this structure appears as conferring on the electrode great dimensional stability.

This is manifested by a greater lifespan as well as by better electrical capacitative yield of the anode.

(2) The large specific surface area of the support, for example in the case of composite materials based on carbon fibres and/or graphite) (of 1,000 to 30,000 fibrils per fibre of about 1 mm$^2$) and the technique of the deposition of the active material on the molecular scale ensure an optimal contact surface area between the active material and the collector support, whence total drainage of the electrons emitted during the discharge and the possibility of obtaining high discharge intensities such as, for example, 10 times the electrical capacity of the element, also ensuring complete reversibility of the electrochemical process avoiding the formation of dendrites on account of a low density of local current.

(3) The large surface area presented also by the active material with respect to the electrolyte enables high ionic exchange densities which reduces the internal resistance of the accumulator to values of the order of 35 microohms/cm$^2$ and which participate, as in (2), in the delivery of high global current strengths from very law local current densities.

(4) The use of this technology of manufacturing electrodes leads to collector supports of little weight where the percentage of inert material not taking part in the electrochemical reaction is low with respect to the mass of active material comprised betwen 30% and 60%. These small weights enable high energy per unit mass to be achieved, for example or the order of 80 Wh/kg at C/5 for a zinc-nickel couple.

The invention relates also to batteries (accumulators) using the above-described anodes. These accumulators can include as cathodes the various known cathodes compatible with the anodes of which the active substance is zinc. In all cases, it seems that the anodes according to the invention contribute considerable advantages to the accumulator obtained.

This is particularly the case for accumulators of which the couple is constituted by zinc and nickel. These accumulators have however certain drawbacks; in fact, in the course of discharge, oxidation of the anode in an alkaline medium leads to the formation, of amphoteric zinc hydroxide which then reacts with the electrolyte to form soluble zincates. The zincate ions then formed have a tendency to migrate within the whole of the electrolyte in the accumulator.

In the course of th recharging of the accumulator, the deposit of metallic zinc is obtained by reduction of the zincate ions which migrate towards the zinc electrode from the electrolyte where they were solubilised. Zinc is then deposited heterogeneously on the electrode on account of the heterogeneity of the current lines coming from the electrodes and from the collectors. In addition, this heterogeneity leads to the formation of dendrites for current lines of high current strength. These dendrites lead to "point effects" well-known in electrolysis which cause the dendrites to grow in a direction perpendicular to the electrode. This growth occurs even through separators arranged between positive and negative electrodes and, consequently, results in internal short-circuits. The zincates are also generators of another phenomena due to "sedimentation" towards the bottom of the tank in the course of the cycles which gradually reduce the working surface area of the anode and lead to a slow drop in the capacity of the accumulator.

The lifespan of the anodes is considerably shortened by these phenomena and the number of cycles is found to be reduced thereby to some dozens of cycles.

It has been found and this is an object of the present invention that it is possible to overcome the difficulties described above by enveloping each of the above-described anodes in a semi-permeable cellulosic membrane and by saturating the alkaline electrolyte located inside said membrane with a zincate. By semi-permeable membrane, is meant a cellulosic membrane of the type of membranes used in electrodialysis which are permeable to OH$^-$ ions and impermeable to cations.

The alkaline electrolyte used is of the known type obtained, for example, by dissolving in a liter of water about 300 g of potassium hydroxide and 30 g of lithium hydroxide. However, according to the invention, this solution must be saturated in zincate, that is to say practically saturated hot with zinc oxide (in this way there is allowed of the order of 70 g/l of zinc oxide).

In addition, it has been found that, in anode compartments thus produced (compartments therefore including an anode according to the invention, an alkaline electrolyte saturated in zincate and compartments bounded by said semi-permeable cellulosic membrane), the alkaline electrolyte had to be jelled. This jellification, known in principle, may advantageously be carried out by adding to the electrolyte from 1 to 5% by weight of a soluble cellulosic adjuvant like, for example, diethylaminoethylcellulose. This jellification has the purpose of conferring on the electrolyte present in the anode compartment a high viscosity (higher than about 20,000 centipoises).

Figure 3:
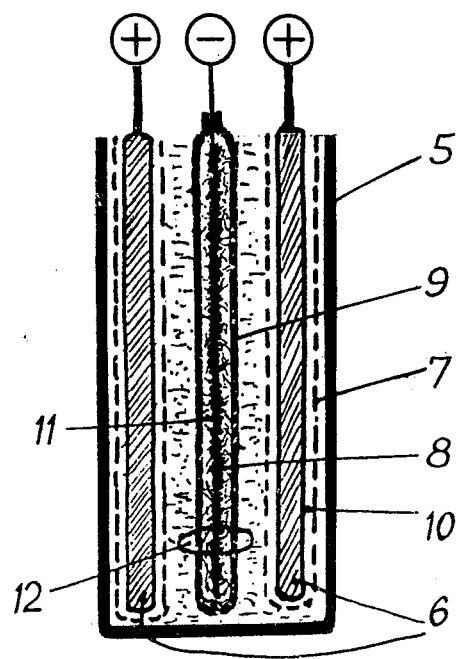
FIG. 3 shows diagrammatically in crosssection an accumulator constructed according to the invention.
Figure 4:
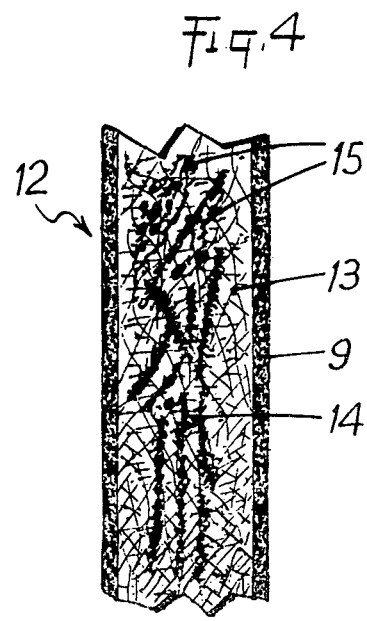
FIG. 4 shows diagrammatically a portion of the anodes compartment of the embodiment of FIG. 1 considerably enlarged.

An accumulator according to the invention is illustrated diagramatically in FIGS. 3 and 4.

FIG. 3 shows diagrammatically in cross section an accumulator 5 constructed according to the invention. It is constituted by two nickel cathodes 6 surrounded with polypropylene felt 7 and by a zinc anode 8 enclosed in the semi-permeable envelope 9. This envelope exhibits two compartments, one cathodic 10, the other anodic 11, within which the cathodic and anodic electrolytes are contained.

FIG. 4 shows diagrammatically a portion 12 of the anodic compartment of FIG. 1 considerably enlarged. This portion 12 is limited on each side by the membrane 9 gripping the anode 8 constituted by a filamentous collector 13 fastening the active material 14 (zinc). The porous substrate of the anode is impregnated with an anodic gel electrolyte which stabilizes the zinc hydroxide 15 in the course of discharge.

The non-limiting example below describes another embodiment of the invention.

As anode there is used a fabric composed of a support coated with copper, then with a layer of cadmium then with a layer of zinc; this anode has been described above.

The accumulator has the structure shown in FIG. 3; this accumulator whose electrodes have dimensions of 130×180 mm comprises a central anode and two lateral cathodes. The anode weighs about 42 g (15 g of support collector and 27 g of zinc). This anode is impregnated with a 6N alkaline electrolyte saturated with zincates and jelled with 1.5% of soldium cellulose glycolate. It is then placed inside an envelope of regenerated cellophane of thickness equal to 0.2 mm.

The two cathodes of nickel weigh about 50 g each (25 g of support collector and 35 g of nickel hydroxide); they are enveloped in a polypropylene felt and impregnated with 6N alkaline electrolyte jelled with 1.5% of sodium cellulose glycolate.

The electrodes are introduced into a tank of 12 mm thickness.

This element of rated capacity equal to 10 Ah is formed in 10 charging and discharging cycles at C/10. The cycles are then continued at C/5 to 80% of rated depth. In this way 16 Wh was obtained for a weight of 200 g (tank not included) namely a power per unit weight of 80 Wh/kg at C/5. The internal resistance is less than 0.3 ohm.

the cycling efficiency is higher than 95%.

No drop in capacity is observed in the course of the 100 first cycles, contrary to known nickel-zinc accumulators.

During the operation of the accumulator, during the discharge, the formation and the stability of the zinc hydroxide within the anode has been verified. The cellulosic membrane maintains them within the anode compartment. The high viscosity of the electrolyte and the great porosity of the anode prevent their migration and their sedimentation.

In the course of recharging, the very large specific surface area of the anode enables the complete reversibility and reduction of the zinc hydroxide into metallic zinc, and, this, without the possibility of formation of dendrites and "pear effect" encountered until now with zinc. These characteristics prevent the consumption of zinc by the electrolyte, and in this way therefore constant capacities and yields in the course of the cycles are achieved, contrary to conventional nickel-zinc accumulators.

What is claimed is:

1. Anodes of a composite material, formed on a support constituted by fibrils, said fibrils being coated with a conducting layer of copper of thickness comprised between 3 and 10 microns, said copper layer being covered with a layer of cadmium of thickness comprised between 3 and 6 microns and said cadmium layer being covered with a layer of zinc of thickness greater than about 20 microns.

2. Accumulators, using at least one anode according to claim 1.

3. Accumulators according to claim 2, wherein said anodes are in a sack of a semi-permeable cellulosic membrane containing an alkaline electrolyte saturated in zincate.

4. Accumulators according to claim 3, wherein said electrolyte is gelled so as to have a viscosity higher than about 20,000 centipoises.

5. Accumulators according to claim 2 comprising nickel-based cathodes.

6. Accumulators according to claim 3, comprising nickel-based cathodes.

7. Accumulators according to claim 4, comprising nickel-based cathodes.

* * * * *

UNITED STATES PATENT AND TRADEMARK OFFICE
CERTIFICATE OF CORRECTION

PATENT NO. : 4,464,446

DATED : August 7, 1984

INVENTOR(S) : Michel Berger et al.

It is certified that error appears in the above-identified patent and that said Letters Patent is hereby corrected as shown below:

The title page should be deleted to appear as per attached title page.

Figures 1 - 4 should be added as per attached sheets .

United States Patent [19]

Berger et al.

[11] Patent Number: 4,464,446
[45] Date of Patent: Aug. 7, 1984

[54] ANODES OF COMPOSITE MATERIALS AND ACCUMULATORS USING SOLID ANODES

[75] Inventors: Michel Berger, Meze; Pierre Schaeffner, St-Medard-en-Jalles, both of France

[73] Assignee: Societe Civile Des Composites Electrolytiques, Paris, France

[21] Appl. No.: 500,326

[22] Filed: Jun. 2, 1983

[30] Foreign Application Priority Data

Jun. 11, 1982 [FR] France .................. 82 10257
Oct. 22, 1982 [FR] France .................. 82 17736

[51] Int. Cl.³ ............................................. H01M 6/14
[52] U.S. Cl. .................................... 429/190; 429/206; 429/209; 429/229; 429/235
[58] Field of Search ............................ 429/229–231, 429/190, 206, 223, 209, 233–235; 252/182.1, 512

[56] References Cited

U.S. PATENT DOCUMENTS

| | | | |
|---|---|---|---|
| 3,042,732 | 7/1962 | Kordesch | 136/30 |
| 3,451,851 | 6/1969 | Stanimirovitch | 136/30 |
| 3,476,604 | 11/1969 | Faber | 136/36 |
| 4,037,033 | 7/1977 | Takamura et al. | 429/229 X |
| 4,215,190 | 7/1980 | Ferrando et al. | 429/235 X |
| 4,332,870 | 6/1982 | Parsen et al. | 429/229 X |
| 4,358,517 | 11/1982 | Jones | 429/206 |
| 4,359,510 | 11/1982 | Iaskier | 429/144 |
| 4,378,414 | 3/1983 | Furukarva et al. | 429/229 X |
| 4,415,636 | 11/1983 | Charkey | 429/229 X |

Primary Examiner—Charles F. LeFevour
Attorney, Agent, or Firm—Weingarten, Schurgin, Gagnebin & Hayes

[57] ABSTRACT

The present invention relates to anodes of composite materials, which are formed on a support constituted by fibrils, which are coated with a conducting layer of copper of thickness comprised between 3 and 10 microns. The copper layer is covered with a layer of cadmium of thickness comprised between 3 and 6 microns and the latter is covered with a layer of zinc of thickness greater than about 20 microns.

7 Claims, 4 Drawing Figures

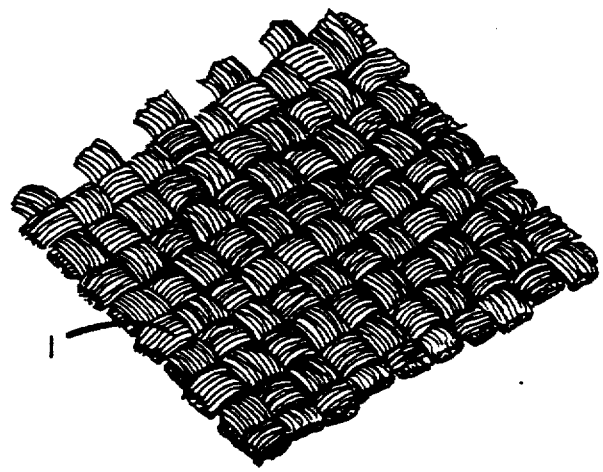

UNITED STATES PATENT AND TRADEMARK OFFICE
CERTIFICATE OF CORRECTION

PATENT NO. : 4,464,446
DATED : August 7, 1984
INVENTOR(S) : Michel Berger et al

It is certified that error appears in the above—identified patent and that said Letters Patent is hereby corrected as shown below:

In the Drawing, kindly add the following FIG. 1:

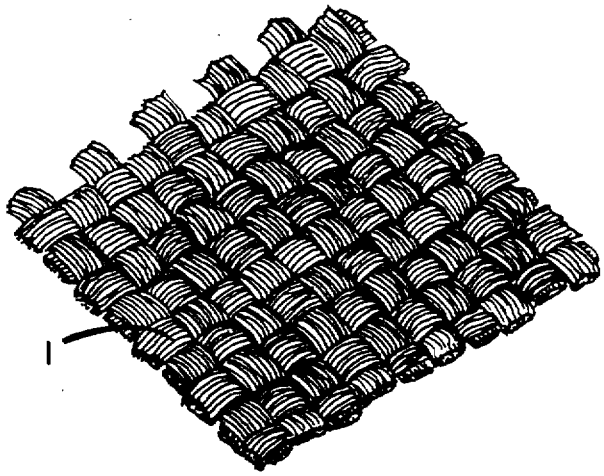

*Fig. 1*

UNITED STATES PATENT AND TRADEMARK OFFICE
CERTIFICATE OF CORRECTION

PATENT NO. : 4,464,446
DATED : August 7, 1984
INVENTOR(S) : Michel Berger et al

It is certified that error appears in the above—identified patent and that said Letters Patent is hereby corrected as shown below:

In the Drawing, kindly add the following FIG. 2:

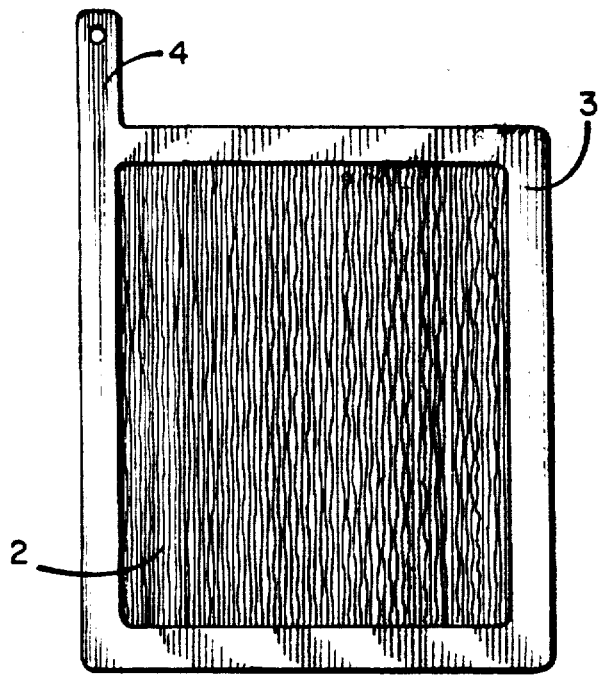

Fig. 2

UNITED STATES PATENT AND TRADEMARK OFFICE
CERTIFICATE OF CORRECTION

PATENT NO. : 4,464,446  Page 5 of 7
DATED : August 7, 1984
INVENTOR(S) : Michel Berger et al It is certified that error appears in the above—identified patent and that said Letters Patent is hereby corrected as shown below:

In the Drawing, kindly add the following FIG. 3:

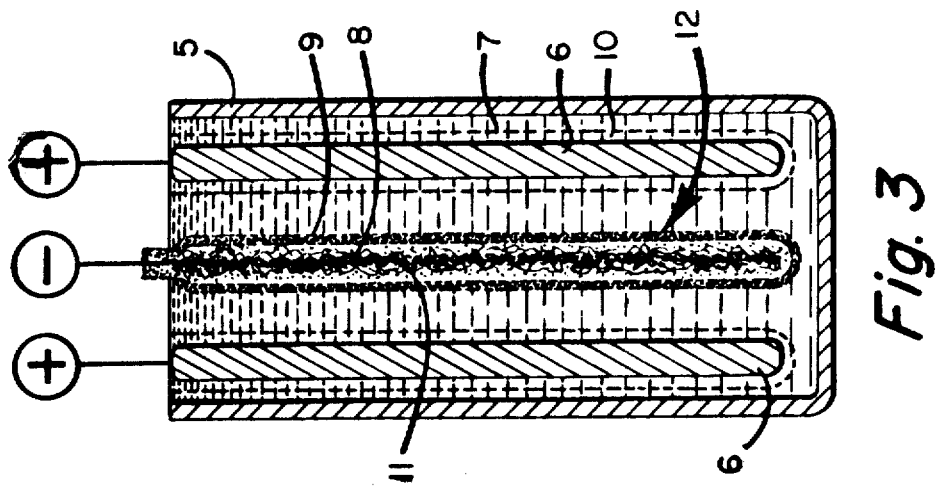

UNITED STATES PATENT AND TRADEMARK OFFICE
CERTIFICATE OF CORRECTION

PATENT NO. : 4,464,446
DATED : August 7, 1984
INVENTOR(S) : Michel Berger et al

It is certified that error appears in the above—identified patent and that said Letters Patent is hereby corrected as shown below:

In the Drawing, kindly add the following FIG. 4:

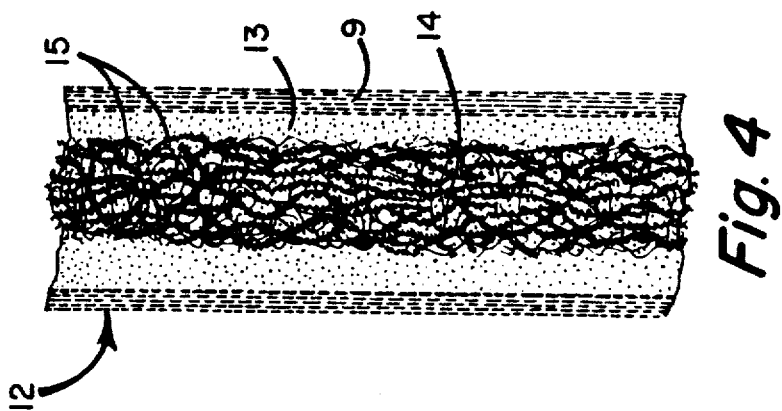

UNITED STATES PATENT AND TRADEMARK OFFICE
CERTIFICATE OF CORRECTION

PATENT NO. : 4,464,446
DATED : August 7, 1984
INVENTOR(S) : Michel Berger et al

It is certified that error appears in the above—identified patent and that said Letters Patent is hereby corrected as shown below:

Column 2, line 32, "crosssection" should read --cross-section--.

Column 3, line 51, "course of th" should read --course of the--.
Column 5, line 15, "the cycling" should read --The cycling--.

Signed and Sealed this

Twenty-third Day of April 1985

[SEAL]

Attest:

DONALD J. QUIGG

Attesting Officer

Acting Commissioner of Patents and Trademarks